United States Patent
Liu et al.

(10) Patent No.: US 9,992,797 B2
(45) Date of Patent: Jun. 5, 2018

(54) WIDE BANDWIDTH FAVORED CHANNEL ACCESS METHODS IN WIRELESS LOCAL AREA NETWORKS

(71) Applicant: MEDIATEK Singapore Pte. Ltd., Singapore (SG)

(72) Inventors: Jianhan Liu, San Jose, CA (US); James June-Ming Wang, San Marino, CA (US)

(73) Assignee: MediaTek Singapore Pte Ltd., Singapore (SG)

( * ) Notice: Subject to any disclaimer, the term of this patent is extended or adjusted under 35 U.S.C. 154(b) by 115 days.

(21) Appl. No.: 14/995,560

(22) Filed: Jan. 14, 2016

(65) Prior Publication Data

US 2016/0128099 A1    May 5, 2016

Related U.S. Application Data

(63) Continuation of application No. PCT/US2014/046928, filed on Jul. 16, 2014.

(60) Provisional application No. 61/847,159, filed on Jul. 17, 2013, provisional application No. 61/864,679, filed on Aug. 12, 2013.

(51) Int. Cl.
*H04W 84/12* (2009.01)
*H04W 74/08* (2009.01)

(52) U.S. Cl.
CPC ....... *H04W 74/08* (2013.01); *H04W 74/0808* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 6,697,626 B1 | 2/2004 | Eidson et al. | 455/452 |
| 2004/0038645 A1 | 2/2004 | Rcunamaki et al. | 455/41.2 |
| 2006/0009161 A1 | 1/2006 | Beecher | 455/67.11 |
| 2007/0060155 A1 | 3/2007 | Kahana et al. | 455/450 |
| 2008/0084835 A1 | 4/2008 | Goel et al. | 370/310 |
| 2008/0112340 A1 | 5/2008 | Luebke | 370/310 |

(Continued)

OTHER PUBLICATIONS

Park, IEEE 802.11ac: Dynamic Bandwidth Channel Access, 2011.*

(Continued)

*Primary Examiner* — Hassan Phillips
*Assistant Examiner* — Ayanah George
(74) *Attorney, Agent, or Firm* — Imperium Patent Works; Zheng Jin

(57) ABSTRACT

A method to improve channel access opportunity for wide bandwidth transmission in wireless local area networks is proposed. The method allows different clear channel assessment (CCA) thresholds for different transmission channel bandwidth. During a primary channel CCA process, a low CCA threshold level is applied for an intended narrow transmission channel bandwidth, while a high CCA threshold level is applied for an indented wide transmission channel bandwidth. In addition to the "all bandwidth transmission branch" that is based on the low CCA level, the "wide bandwidth transmission branch" is based on the high CCA level, which increases the opportunity for channel access by raising the CCA levels based on intended transmission channel bandwidths. As a result, the likelihood of wide channel transmission is increased.

18 Claims, 5 Drawing Sheets

(56) References Cited

U.S. PATENT DOCUMENTS

| | | | |
|---|---|---|---|
| 2008/0212476 A1* | 9/2008 | Konradsson | H04W 74/085 370/235 |
| 2010/0020711 A1 | 1/2010 | Horisaki et al. | 370/252 |
| 2012/0057534 A1 | 3/2012 | Park | 370/329 |
| 2014/0293905 A1* | 10/2014 | Tian | H04W 72/02 370/329 |

OTHER PUBLICATIONS

EPO, Search Report for the EP patent application 14825719.9 dated Jan. 26, 2017, 2017 (7 pages).

Minyoung Park, Intel Labs, Intel Corporation, IEEE 802.11ac: Dynamic Bandwidth Channel Access, *figures 1-3* *Section II. A. 1; p. 2, col. 1* *Section II. B; cols. 1, 2* *Section III. C; p. 3, cols. 1, 2*.

International Search Report and Written Opinion of International Search Authority for PCT/US201414/046928 dated Nov. 7, 2014(8 pages).

* cited by examiner

WIDE BANDWIDTH FAVORED CHANNEL ACCESS METHODS IN WIRELESS LOCAL AREA NETWORKS

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/US2014/046928, with an international filing date of Jul. 16, 2014, which in turn claims priority from U.S. Provisional Application No. 61/847,159 filed on Jul. 17, 2013 and U.S. Provisional Application No. 61/864,679 filed on Aug. 12, 2013. This application is a continuation of International Application No. PCT/US2014/046928, which claims priority from U.S. Provisional Application Nos. 61/847,159 and 61/864,679. International Application No. PCT/US2014/046928 is pending as of the filing date of this application, and the United States is a designated state in International Application No. PCT/US2014/046928. This application claims priority under 35 U.S.C. § 119 from U.S. Provisional Application No. 61/847,159, entitled "Wide Bandwidth Favored Channel Access Methods in Wireless Local Area Networks," filed on Jul. 17, 2013; U.S. Provisional Application No. 61/864,679, entitled "Wide Bandwidth Favored Channel Access Methods in Wireless Local Area Networks," filed on Aug. 12, 2013. The disclosure of each of the foregoing documents is incorporated herein by reference.

TECHNICAL FIELD

The disclosed embodiments relate generally to wireless network communications, and, more particularly, to channel access methods in wireless local area networks.

BACKGROUND

IEEE 802.11 is a set of media access control (MAC) and physical layer (PHY) specification for implementing wireless local area network (WLAN) communication, called WiFi, in the unlicensed (2.4, 3.6, 5, and 60 GHz) frequency bands. The standards and amendments provide the basis for wireless network products using the WiFi frequency bands. For example, IEEE 802.11ac is a wireless networking standard in the 802.11 family providing high-throughput WLANs on the 5 GHz band. Significant wider channel bandwidths (20 MHz, 40 MHz, 80 MHz, and 160 MHz) were proposed in the IEEE 802.11ac standard. For backward compatibility, a wide bandwidth channel is composed of several narrow bandwidth channels, e.g., a channel of 80 MHz is composed of four 20 MHz channels. Similarly, in WLAN based on IEEE 802.11ah standard, a channel of 8 MHz is composed of four 2 MHz channels by scaling down the IEEE 802.11ac channels by a factor of 10.

In IEEE 802.11ac, a transmitter of a BSS (basis service set) of certain bandwidth is allowed to transmit radio signals onto the shared wireless medium depending on clear channel assessment (CCA) sensing. For a BSS of certain bandwidth, a valid transmission sub-channel shall have bandwidth, allowable in the IEEE 802.11ac, equal to or smaller than the full bandwidth of the BSS and contains the designated primary sub-channel of the BSS. Based on the CCA sensing in the valid transmission bandwidths, the transmitter is allowed to transmit in any of the valid transmission sub-channels as long as the CCA indicates the sub-channel (or full channel) is idle. This dynamic transmission bandwidth scheme allows system bandwidth resource to be efficiently utilized.

An enhanced distributed channel access protocol (EDCA) is used in IEEE 802.11ac as a channel contention procedure for wireless devices to gain access to the shared wireless medium, e.g., to obtain a transmitting opportunity (TXOP) for transmitting radio signals onto the shared wireless medium based on CSMA/CA with random back-off contention scheme. The basic assumption of EDCA is that a packet collision can occur if a device transmits signal under the channel "BUSY" condition when the received signal level is higher than CCA level. On the other hand, a device can transmit signal under the channel "IDLE" condition when the received signal level is lower than CCA level. Typically, the EDCA TXOP is based solely on activity of the primary channel, while the transmit channel width determination is based on the secondary channel CCA during an interval (PIFS) immediately preceding the start of the TXOP.

Specifically, the current channel access method in WLAN based on IEEE 802.11ac is as follows. The primary channel CCA (PC CCA) is always on primary channels (PC). By comparing received signal strength of the PC with predetermined thresholds, also referred to as CCA levels, PC CCA indicates the PC is "IDLE" or "BUSY". When the PC is "IDLE", a counter is starting to count down. When the counting down reaches zero, the station checks the status of secondary channels (SC) in point (coordination function) inter-frame space (PIFS) time period. If the SC is "IDLE" in PIFS time, the station transmits radio signals using wide bandwidth; else, the station transmits radio signals using only the 20 MHz PC.

The problem of such method is that wideband has less opportunity than narrow band because the secondary channels (SC) could be used by neighbor basic service set (BSS). However, wider channel bandwidth transmission is both bandwidth and power efficient. First, in OFDM/OFDMA systems, higher number of subcarriers are achieved with reduced guard tones. Second, lower rate codes are more powerful than higher rate codes. Furthermore, wider channel bandwidth transmission causes less interference in dense deployment environment because the transmitting (TX) spectral density is lower. Due to these reasons, improving the wide bandwidth opportunities can enhance the throughput of the network.

SUMMARY

A method to improve channel access opportunity for wide bandwidth transmission in wireless local area networks is proposed. The method allows different clear channel assessment (CCA) thresholds for different transmission channel bandwidth. During a primary channel CCA process, a low CCA threshold level is applied for an intended narrow transmission channel bandwidth, while a high CCA threshold level is applied for an indented wide transmission channel bandwidth. In addition to the "all bandwidth transmission branch" that is based on the low CCA level, the "wide bandwidth transmission branch" is based on the high CCA level, which increases the opportunity for channel access for wide channel transmission.

In one embodiment, a station initiates channel access by performing a primary channel CCA to gain access to wireless medium for transmitting radio signals. The station measures the received signal strength for the primary channels (PC). The station determines a PC CCA status by comparing the received signal strength with a first lower CCA level and a second higher CCA level. The first lower CCA level is for an intended narrow TX channel width, and the second higher CCA level is for an intended wide TX channel width. The station starts a first counting down if the PC CCA status is IDLE when the received signal strength is lower than the lower CCA level. The station then performs secondary channel CCA upon the first counting down to zero for narrow and wide channel transmission. The station starts a second counting down if the PC CCA status is BUDLE when the received signal strength is between the lower and the higher CCA levels. The station then performs secondary channel CCA upon the second counting down to zero for wide channel transmission.

In one specific example, the wireless local area network is based on IEEE 802.11ah standard. For 16 MHz BSS, the first lower CCA level for primary 2 MHz is −89 dBm for 2 MHz and 4 MHz intended transmission. The second higher CCA level for primary 2 MHz is −86 dBm for 8 MHz and 16 MHz intended transmission. By raising the CCA levels based on intended transmission bandwidths, the likelihood of wide channel transmission is increased.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1A:
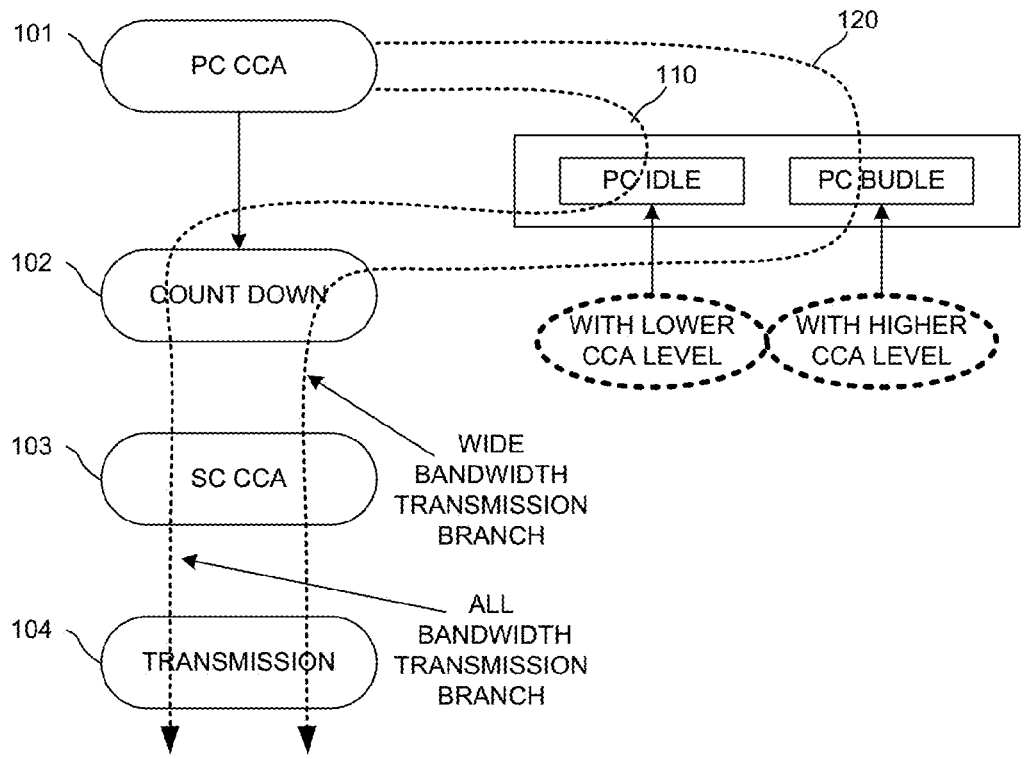
FIG. 1A illustrates a wireless station that initiates channel access in a wireless local area network in accordance with one novel aspect.

FIG. 1A illustrates a wireless station that initiates channel access in a wireless local area network in accordance with one novel aspect. In IEEE 802.11 wireless networks, an enhanced distributed channel access protocol (EDCA) is used as a channel contention procedure for a wireless station to gain access to the shared wireless medium, e.g., to obtain a transmitting opportunity (TXOP) for transmitting radio signals onto the shared wireless medium. During the first stage of EDCA, the TXOP is obtained based solely on activity of the primary channel. The primary channel is BUSY if one of the predefined conditions is met based on Clear Channel Assessment (CCA) sensitivity levels. If the primary channel is IDLE, then station starts counting down. When the counting down reaches zero, the station starts the second stage of EDCA, where the transmit channel width is selected based on the secondary channel CCA during an interval (PIFS) immediately preceding the start of TXOP. The secondary channel is BUSY if one of the predefined conditions is met based on CCA levels.

In the example of FIG. 1, the station first performs primary channel CCA (PC CCA) in step 101. For example, the primary channel in IEEE 802.11ac is always on primary channels (PC). By comparing the received signal strength of PC with predetermined CCA levels, PC CCA determines whether the PC is IDLE. If the PC is IDLE, the station starts counting down in step 102. Upon the counting down reaches zero, the station performs secondary channel CCA (SC CCA) in step 103. If the SC is IDLE in PIFS time, the station transmits radio signals using wide bandwidth (e.g., 40/80/160 MHz in IEEE 802.11ac) in step 104. Otherwise, the station transmits radio signals using only the 20 MHz PC in step 104.

In general, higher channel width transmission is both bandwidth and power efficient. First, in OFDM/OFDMA systems, higher number of subcarriers are achieved with reduced guard tones. Second, lower rate codes are more powerful than higher rate codes. Furthermore, higher channel width transmission causes less interference in dense deployment environment because the transmitting (TX) spectral density is lower. However, under the current channel access procedure, PC CCA is always based on one or more predetermined CCA levels for primary channels, which reduces the likelihood of wide channel bandwidth transmission. This is because the secondary channel could be used by neighbor basic service set (BSS). In addition, the TX power spectral density of a narrower TX channel is typically higher than the TX power spectral density of a wider TX channel.

Figure 1B:
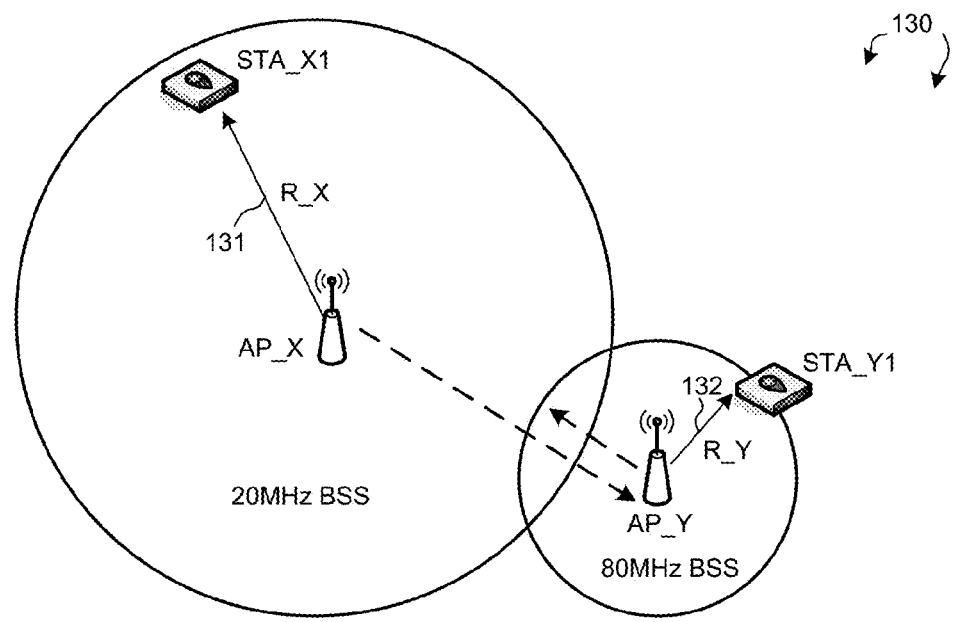
FIG. 1B illustrates different interference ranges of different channel widths in an IEEE 802.11ac system.

FIG. 1B illustrates different interference ranges of different channel widths in an IEEE 802.11ac wireless network 130. Wireless network 130 comprises a plurality of access points (APs) AP_X and AP_Y and a plurality of stations (STAs) STA_X1 and STA_Y1. In the example of FIG. 1B, AP_X transmits radio signals using a 20 MHz TX channel width. The 20 MHz PPDU 131 has a radio signal propagation coverage with radius R_X. AP_Y transmits radio signals using a 80 MHz TX channel width. The 80 MHz PPDU 132 has a radio signal propagation coverage with radius R_Y. Because the TX spectral density is not the same for all TX channel widths, i.e., TX_PWR/20M>TX_PWR/40M>TX_PWR/80M>TX_PWR/160M, it can be seen that the overlapping radio signal propagation coverage have different radius (e.g., R_X>R_Y). As a result, the 20 MHz PPDU 131 transmitted from AP_X may interfere AP_Y. On the other hand, the 80 MHz PPDU 132 transmitted from AP_Y does not interfere AP_X. In the example of FIG. 1B, the 80 MHz BSS heard the 20 MHz OBSS. Based on the current IEEE 802.11g/n/ac rules, it cannot transmit 80 MHx PPDU even an 80 MHz transmission does not affect 20 MHz transmission.

Figures 1C, 2:
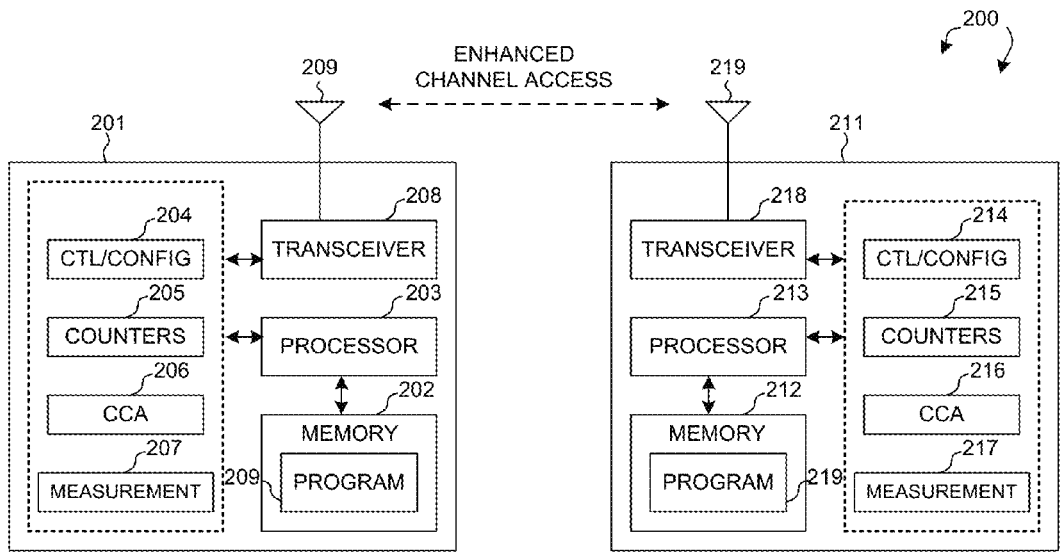
FIG. 1C illustrates IEEE 802.11ac EDCA TXOP and channel access conditions.
FIG. 2 is a simplified block diagram of a transmitting device and a receiving device in accordance with one novel aspect.

This is because the primary channel CCA rule in existing IEEE 802.11g/n/ac treats different channel width the same way. FIG. 1C illustrates IEEE 802.11ac EDCA TXOP and channel access conditions. Table 150 in FIG. 1C lists all the conditions for CCA busy on the primary channels. It can be seen that the CCA level/channel width (in unit of 20 MHz) is equal to −82 dBm for any 20 MHz, 40 MHz, 80 MHz, and 160 MHz RX channels. However, the radio signal propagation of a narrower TX channel is larger than the radio signal propagation of a wider TX channel. As depicted in FIG. 1B, a narrower 20 MHz TX channel transmission interferes (defers) a wider 80 MHz channel transmission even though the wider channel width transmission might not cause interference to the narrower TX channel width transmission. As a result, the likelihood of the wider channel transmission is reduced based on the current CCA levels. Therefore, if the intended transmission channel bandwidth is wide (e.g., 40/80/160 MHz in IEEE 802.11ac), then the CCA level for the wide channel should be higher than the CCA level for the 20 MHz PC, which lead to high likelihood of PC IDLE conditions and higher probability of medium access.

In one novel aspect, an enhanced channel access favoring wide channel bandwidth transmission is proposed. The channel access opportunity is granted based on PC CCA associated with intended transmission channel bandwidth and SC CCA in PIFS. More specifically, different CCA levels are applied in PC CCA for both narrow channel and wide channel bandwidth such that the likelihood of wide channel transmission is increased.

Referring back to FIG. 1A, the station first performs primary channel CCA (PC CCA) in step 101. Instead of using one CCA level defined for the 20 MHz PC, different CCA levels are defined for different intended transmission channel bandwidths. By comparing the received signal strength of PC with the different CCA levels, the station determines whether the PC CCA status accordingly. The PC CCA status is BUSY if the signal strength is above the highest CCA level. The PC CCA status is IDLE if the signal strength is below the lowest CCA level. The PC CCA status is BUDLE if the signal strength is between the lowest and the highest CCA level.

If the PC CCA status is IDLE, then the station follows the same steps as depicted by line 110. On the other hand, if the PC CCA status is BUDLE, the station follows the steps as depicted by line 120. The station starts counting down in step 102. Upon the counting down reaches zero, the station performs secondary channel CCA (SC CCA) in step 103. If the SC is IDLE in PIFS time, the station transmits radio signals using wide bandwidth in step 104. Otherwise, the station goes back to step 101 for PC CCA. It can be seen that in addition to the "all bandwidth transmission branch" depicted by line 110, the "wide bandwidth transmission branch" depicted by line 120 increases the opportunity for channel access by raising the CCA levels based on intended transmission channel bandwidths. As a result, the likelihood of wide channel transmission is increased.

FIG. 2 is a simplified block diagram of a transmitting device 201 and a receiving device 211 in accordance with one novel aspect. The transmitting device is referred to as an initiator, and the receiving device is referred to as a responder. Both devices can be an AP station or a non-AP station. Transmitting device 201 comprises memory 202, a processor 203, a control and configuration module 204, a power controller 205, an EDCA module 206, a CCA module 207, and a transceiver 208 coupled to antenna 209. Similarly, receiving device 211 comprises memory 212, a processor 213, a control and configuration module 214, a power controller 215, an EDCA module 216, a CCA module 217, and a transceiver 218 coupled to antenna 219. In the transmitting direction, the transceiver converts received baseband signals from the processor to RF signals and sends out to the antenna. In the receiving direction, the processor processes the received baseband signals from the transceiver and invoke different functional modules to perform various features supported by the wireless devices.

The different modules are functional modules that can be implemented in software, firmware, hardware, or any combination thereof. The function modules, when executed by processors 203 and 213 (via program instructions 209 and 219 contained in memory 202 and 212), interwork with each other to allow the wireless devices to perform enhanced channel access. For example, the measurement module performs radio signal measurements, the control and configuration module performs various control and configuration functionalities, the CCA module initiates the EDCA channel contention procedure and performs primary channel CCA based on the intended TX channel width and also performs secondary channel CCA for TX channel width selection, and the counters control the counting down in the EDCA procedure.

Figures 3, 4:
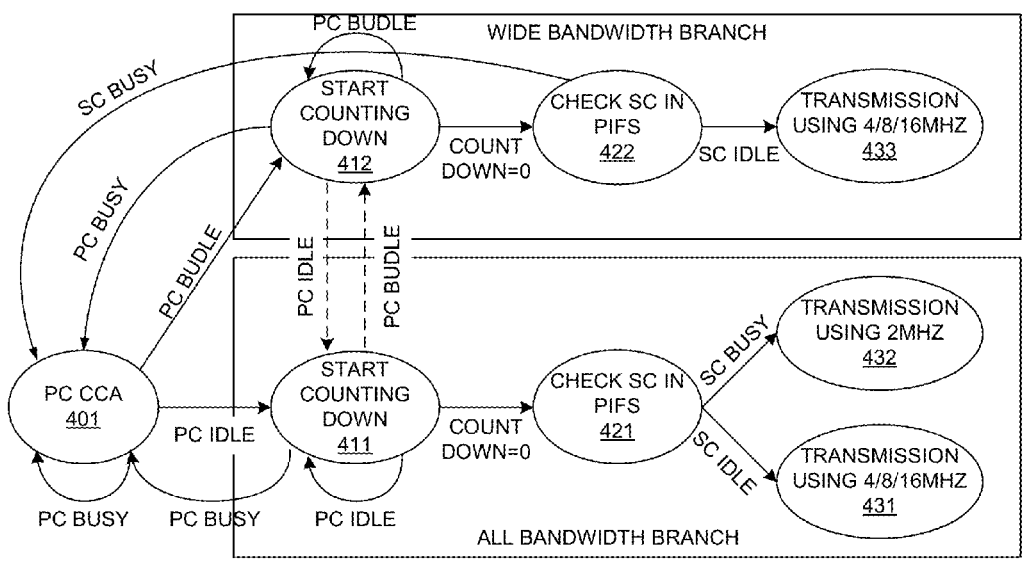
FIG. 3 illustrates different CCA levels associated with different intended transmission channel bandwidths in IEEE 802.11ah systems.
FIG. 4 illustrates a first embodiment of a wide bandwidth favored transmission method in 16 MHz BSS.

FIG. 3 illustrates different CCA levels associated with different intended transmission channel bandwidths in IEEE 802.11ah systems. In wireless local area networks based on IEEE 802.11ah standards, a BSS can operate on 1 MHz, 2 MHz, 4 MHz, 8 MHz, or 16 MHz bandwidth. The primary channel is the 2 MHz PC, which is used in channel assessment and generating a PC CCA status. In one embodiment, the PC CCA status is generated by comparing the PC signal strength with four different CCA threshold levels as depicted in table 330. For intended 2 MHz transmission, the PC CCA threshold is C1; for intended 4 MHz transmission, the PC CCA threshold is C2; for intended 8 MHz transmission, the PC CCA threshold is C3; and for intended 16 MHz transmission, the PC CCA threshold is C4. In general, the thresholds have a relation as $C4 \geq C3 \geq C2 \geq C1$. In one example, the thresholds setting is $C4=C3+x=C2+2x=C1+3x$, where x is a positive scalar with unit in decibel (dB). One simple choice is x=3 dB.

By comparing the received signal strength on the 2 MHz PC with different PC CCA thresholds, three different PC CCA statuses are generated and sent to upper layer, for example, the media access control (MAC) layer. The three different PC CCA statuses are: 1) "PC IDLE"—if the signal strength is below C1 (the PC CCA threshold of the narrowest bandwidth supported by the BSS); 2) "PC BUSY"—if the signal strength is above C4 (the PC CCA threshold of the widest bandwidth supported by the BSS); and 3) "PC BUDLE"—if the signal strength is between the PC CCA threshold of the narrowest bandwidth and the PC CCA threshold of the widest bandwidth supported by the BSS.

In another embodiment, the PC CCA status is generated by comparing the received PC signal strength with two different CCA threshold levels as depicted in table 340. For intended 2 MHz and 4 MHz transmission, the PC CCA threshold is C1=−89 dB, the SC CCA level for secondary 2 MHz channel is −82 dB; and for intended 8 MHz and 16 MHz transmission, the PC CCA threshold is C2=−86 dB, the SC CCA level for the secondary 4/8 MHz channel is 82 dB. By comparing the received PC signal strength with the two different PC CCA thresholds, three different PC CCA statuses are generated: 1) "PC IDLE"—if the received signal strength is below −89 dB (the PC CCA threshold of the 2/4 MHz bandwidth supported by the BSS); 2) "PC BUSY"—if the received signal strength is above −84 dB (the PC CCA threshold of the 8/16 MHz bandwidth supported by the BSS; and 3) "PC BUDLE"—if the received signal strength is between −89 dB and −86 dB (the PC CCA threshold of the widest bandwidth and the PC CCA threshold of the narrowest bandwidth supported by the BSS).

In accordance with one novel aspect, by introducing more CCA thresholds associated with different intended transmission channel bandwidth, a station can not only attempting access (start counting down) when PC status is IDLE, but also attempting access (start counting down) when the PC status is BUDLE. In addition, the CCA threshold associated with wide intended transmission channel is higher, which results in easier PC BUDLE status acquisition. As a result, the likelihood of wide channel transmission is increased. Different embodiments of wide bandwidth favored transmission method based on multiple CCA thresholds are now described below.

FIG. 4 illustrates a first embodiment of a wide bandwidth favored transmission method in 16 MHz BSS. In 16 MHz BSS, the supported transmission channel bandwidths are 2 MHz, 4 MHz, 8 MHz, and 16 MHz, and the primary channel is the 2 MHz PC. When initiating channel access, a station starts with primary channel CCA (PC CCA) (step 401), and measures the received signal strength for the 2 MHz PC. The station then compares the signal strength with the multiple CCA thresholds as depicted in table 330 of FIG. 3, and generates a PC CCA status. If the PC CA status is "PC BUSY", then the station is not allowed to transmit. The station goes back to PC CCA (step 401).

When the PC CCA status is "PC IDLE", the station enters "all bandwidth branch", and starts to count down a first counter (step 411). When the counting down reaches zero, the station performs secondary channel CCA (SC CCA) and checks the status for secondary channels (SC) in point (coordination function) inter-frame space (PIFS) time (step 421). If the SC is "IDLE" in PIFS time, then the station transmits using wide bandwidth channel of 4/8/16 MHz (step 431). For example, the station transmits using 4 MHz if the secondary 2 MHz channel is IDLE, using 8 MHz if the secondary 2 MHz and 4 MHz channels are IDLE, using 16 MHz if the secondary 2 MHz, 4 MHz, and 8 MHz channels are all IDLE. If the SC is "IDLE" in PIFS time, then the station transmits using only the 2 MHz PC (step 432).

When the PC CCA status is "PC BUDLE", the station enters "wide bandwidth branch", and starts to count down a second counter (step 412). When the counting down reaches zero, the station performs secondary channel CCA (SC CCA) and checks the status for secondary channels (SC) in point (coordination function) inter-frame space (PIFS) time (step 422). If the SC is "IDLE" in PIFS time, then the station transmits using wide bandwidth channel of 4/8/16 MHz (step 433); else, the station is not allowed to transmit and goes back to PC CCA (step 401).

When the station indicates "PC BUDLE", the upper layer needs to know that there is an opportunity for transmission but the transmission is not guaranteed. In addition, the PC CCA status of "PC BUDLE" indicates different allowable transmission bandwidth, depending on the received signal strength. For example, if the signal strength is between C4 and C3, then only transmission using the 16 MHz bandwidth is possible. If the signal strength is between C3 and C2, then transmission using 8 MHz and 16 MHz is possible. If the signal strength is between C2 and C1, then transmission using 4 MHz, 8 MHz, and 16 MHz is possible. When the station goes to the wide bandwidth branch, the station remembers what bandwidth is allowed for transmission.

During the counting down in step 411 and 412, the station keeps performing the PC CCA process. For example, in step 411, the station continues the PC CCA process. If the PC CCA status is "IDLE", the station stays in step 411 and continues to counting down the first counter; if the PC CCA status is "BUSY", then the station goes back to step 401 for PC CCA; if the PC CCA status is "BUDLE", then the station enters the wide bandwidth branch and goes to step 412 for counting down the second counter. Similarly, in step 412, the station continues the PC CCA process. If the PC CCA status is "BUDLE", the station stays in step 412 and continues to counting down the second counter; if the PC CCA status is "BUSY", then the station goes back to step 401 for PC CCA; if the PC CCA status is "IDLE", then the station enters the all bandwidth branch and goes to step 411 for counting down the first counter.

Figure 5:
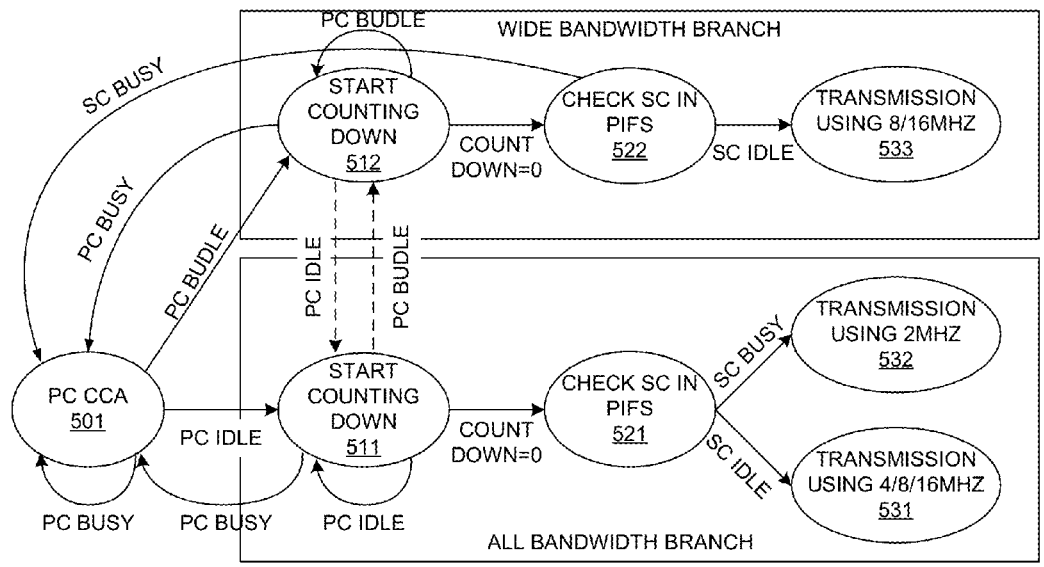
FIG. 5 illustrates a second embodiment of a wide bandwidth favored transmission method in 16 MHz BSS.

FIG. 5 illustrates a second embodiment of a wide bandwidth favored transmission method in 16 MHz BSS. This embodiment is substantially the same as the first embodiment of FIG. 4. However, the multiple CCA thresholds are depicted in table 340 of FIG. 3. Because there is only two primary channel CCA levels, only one BUDLE state is required. The PC CCA status is "PC BUDLE" when the received signal strength for the 2 MHz PC is between −89 dB and −84 dB. In the all bandwidth branch, upon SC CCA in step 521, if the secondary 2 MHz channel is idle (if the signal level of the 2 MHz SC is less than −82 dB), then the station may transmit using 4/8/16 MHz channel (step 531); else the station may transmit using the 2 MHz channel (step 532). In the wide bandwidth branch, the station is only allowed to transmit using 8/16 MHz channel if the secondary 4/8 MHz channel is idle (if the signal level of the 4/8 MHz SC is less than −82 dB) (step 533); else the station is not allowed to transmit. Note that in the wide bandwidth branch, dynamic bandwidth needs to be turned off to avoid responder requires narrower bandwidth that the initiator is not allowed to use.

Figure 6:
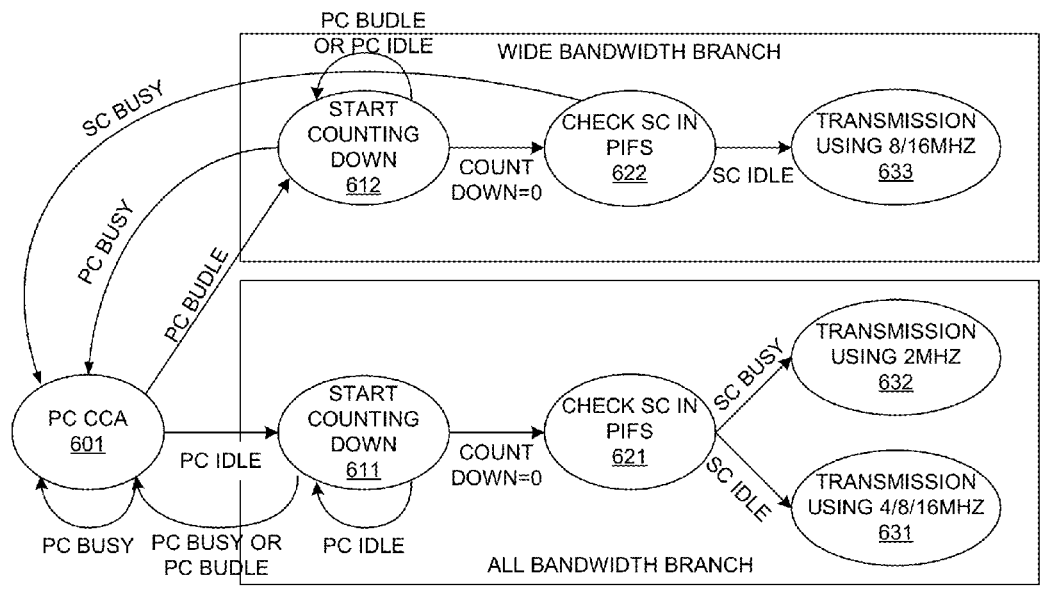
FIG. 6 illustrates a third embodiment of a wide bandwidth favored transmission method in 16 MHz BSS.

FIG. 6 illustrates a third embodiment of a wide bandwidth favored transmission method in 16 MHz BSS. This embodiment is substantially the same as the second embodiment of FIG. 5. However, a more aggressive approach is shown in FIG. 6. In this embodiment, once the station enters into a branch, it will not transfer to another branch until the counter goes to zero. For example, if the station enters the all bandwidth branch and starts counting down using a first counter in step 611, then it stays counting down the first counter if the PC CCA status is IDLE. The station does not go to the wide bandwidth branch if the PC CCA status is BUDLE; instead, it goes back to step 601 for PC CCA. On the other hand, if the station enters the wide bandwidth branch and starts counting down using a second counter in step 612, then it stays counting down the second counter if the PC CCA status is BUDLE or IDLE. This way, the counters can be counted down faster and reaches zero in a shorter time. In addition, both branch can simultaneously countdown the first counter and the second counter to increase the channel access probability.

Figure 7:
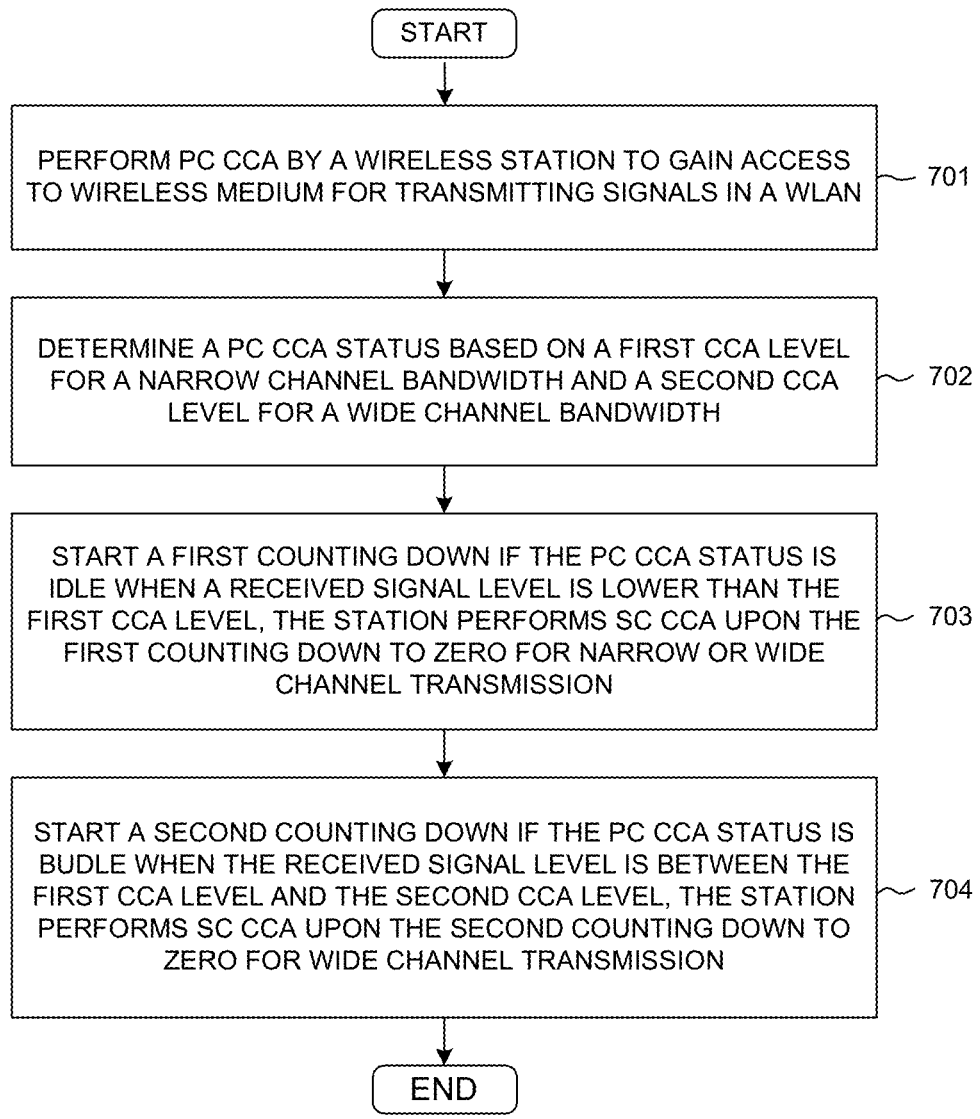
FIG. 7 is a flow chart of a method of a wide bandwidth favored transmission method in a wireless local area network in accordance with one novel aspect.

FIG. 7 is a flow chart of a method of a wide bandwidth favored transmission method in a wireless local area network in accordance with one novel aspect. In step 701, a station initiates channel access by performing a primary channel CCA to gain access to wireless medium for transmitting radio signals. The station measures the received signal strength for the primary channel (PC). In step 702, the station determines a PC CCA status by comparing the received signal strength with a first lower CCA level and a second higher CCA level. The first lower CCA level is for an intended narrow TX channel width, and the second higher CCA level is for an intended wide TX channel width. In step 703, the station starts a first counting down if the PC CCA status is IDLE when the received signal strength is lower than the lower CCA level. The station then performs secondary channel CCA upon the first counting down to zero for narrow and wide channel transmission. In step 704, the station starts a second counting down if the PC CCA status is BUDLE when the received signal strength is between the lower and the higher CCA levels. The station then performs secondary channel CCA upon the second counting down to zero for wide channel transmission.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   performing primary channel clear channel assessment (PC CCA) by a wireless station to gain access to wireless medium for transmitting radio signals in a wireless local area network;
   determining a PC CCA status by comparing a received signal strength of the PC with a first lower CCA level and a second higher CCA level;
   starting a first counting down if the PC CCA status is IDLE when the received signal strength is lower than the lower CCA level, wherein the station performs secondary channel CCA upon the first counting down to zero for narrow or wide channel transmission; and
   starting a second counting down if the PC CCA status is BUDLE when the received signal strength is between the lower and the higher CCA level, wherein the station performs secondary channel CCA upon the second counting down to zero for wide channel transmission.

2. The method of claim 1, wherein the first lower CCA level is for an intended narrow TX channel width, and wherein the second higher CCA level is for an intended wide TX channel width.

3. The method of claim 2, wherein the PC CCA status is IDLE, and wherein the station transmits radio signals using the narrow TX channel width if a secondary channel status BUSY.

4. The method of claim 2, wherein the PC CCA status is IDLE, and wherein the station transmits radio signals using the wide TX channel width if a secondary channel status is IDLE.

5. The method of claim 2, wherein the PC CCA status is BUDLE, and wherein the station transmits radio signals using the wide TX channel width if a secondary channel status is IDLE.

6. The method of claim 2, wherein the PC CCA status is BUDLE, and wherein the station goes back to PC CCA if a secondary channel status is BUSY.

7. The method of claim 1, wherein the station performs the first counting down and the second counting down simultaneously.

8. The method of claim 1, wherein the station enters from the first counting down to the second counting down if the PC CCA status changes from IDLE to BUDLE.

9. The method of claim 1, wherein the station enters from the second counting down to the first counting down if the PC CCA status changes from BUDLE to IDLE.

10. A wireless station, comprising:
    a radio frequency (RF) receiver that received a radio signal over a primary channel (PC);
    a channel clear channel assessment (CCA) circuit that performs primary channel CCA (PC CCA) to gain access to wireless medium for transmitting radio signals in a wireless local area network, wherein the CCA module determines a PC CCA status by comparing a received signal strength of the received radio signal of the PC with a first lower CCA level and a second higher CCA level;
    a first counter that starts a first counting down if the PC CCA status is IDLE when a received signal strength is lower than the lower CCA level, wherein the station performs secondary channel CCA upon the first counting down to zero for narrow or wide channel transmission; and
    a second counter that starts a second counting down if the PC CCA status is BUDLE when the received signal strength is between the lower and the higher CCA level, wherein the station performs secondary channel CCA upon the second counting down to zero for wide channel transmission.

11. The station of claim 10, wherein the first lower CCA level is for an intended narrow TX channel width, and wherein the second higher CCA level is for an intended wide TX channel width.

12. The station of claim 11, wherein the PC CCA status is IDLE, and wherein the device transmits radio signals using the narrow TX channel width if a secondary channel status BUSY.

13. The station of claim 11, wherein the PC CCA status is IDLE, and wherein the device transmits radio signals using the wide TX channel width if a secondary channel status is IDLE.

14. The station of claim 11, wherein the PC CCA status is BUDLE, and wherein the device transmits radio signals using the wide TX channel width if a secondary channel status is IDLE.

15. The station of claim 11, wherein the PC CCA status is BUDLE, and wherein the device goes back to PC CCA if a secondary channel status is BUSY.

16. The station of claim 10, wherein the station performs the first counting down and the second counting down simultaneously.

17. The station of claim 10, wherein the station enters from the first counting down to the second counting down if the PC CCA status changes from IDLE to BUDLE.

18. The station of claim 10, wherein the station enters from the second counting down to the first counting down if the PC CCA status changes from BUDLE to IDLE.

* * * * *